(12) United States Patent
Nelson et al.

(10) Patent No.: US 8,870,638 B2
(45) Date of Patent: Oct. 28, 2014

(54) AIR RETURN BULKHEAD WITH QUICK RELEASE MOUNTING SYSTEM

(75) Inventors: Chad Nelson, Rice Lake, WI (US); Stephen F. Bennett, San Marino, CA (US)

(73) Assignee: FG Products, Inc., Rice Lake, WI (US)

( * ) Notice: Subject to any disclaimer, the term of this patent is extended or adjusted under 35 U.S.C. 154(b) by 1210 days.

(21) Appl. No.: 12/013,227

(22) Filed: Jan. 11, 2008

(65) Prior Publication Data

US 2008/0160897 A1 Jul. 3, 2008

Related U.S. Application Data

(63) Continuation of application No. 10/809,286, filed on Mar. 25, 2004, now Pat. No. 7,351,136.

(51) Int. Cl.
*B60H 1/00* (2006.01)
(52) U.S. Cl.
CPC ........ *B60H 1/00535* (2013.01); *B60H 1/00364* (2013.01)
USPC ....................................... 454/118
(58) Field of Classification Search
USPC ........... 454/118, 88, 89, 90, 237, 69, 146, 91; 296/24.41
See application file for complete search history.

(56) References Cited

U.S. PATENT DOCUMENTS

| | | |
|---|---|---|
| 175,543 A | 3/1876 | Wickes |
| 1,071,449 A | 8/1913 | McAfee |
| 1,854,779 A | 4/1932 | Brigham, Jr. |
| 1,896,198 A | 2/1933 | MacMillan |
| 2,052,914 A | 9/1936 | Williams |
| 2,178,213 A | 10/1939 | Weiller |
| 2,424,070 A | 7/1947 | Welsh |
| 2,521,272 A | 9/1950 | Williams |
| 2,534,272 A | 12/1950 | Kleist |
| 2,543,175 A | 2/1951 | Kilgore |
| 2,909,234 A | 10/1959 | Belk |
| 2,923,384 A | 2/1960 | Black |
| 2,978,884 A | 4/1961 | D'Aleandro et al. |
| 2,978,993 A | 4/1961 | Hall |
| 3,100,384 A | 8/1963 | Lowensohn |
| 3,206,946 A | 9/1965 | Lindersmith et al. |

(Continued)

FOREIGN PATENT DOCUMENTS

| | | |
|---|---|---|
| EP | 1099598 A2 | 5/2001 |
| GB | 2 226 993 | 7/1990 |
| SU | 575-240 | 11/1977 |

OTHER PUBLICATIONS

Trade Literature describing the FG Products Uni-Flow Side Mount Air Ducts, believed to have been publicly available on or before Mar. 25, 2004.

(Continued)

*Primary Examiner* — Steven B McAllister
*Assistant Examiner* — Brittany Towns
(74) *Attorney, Agent, or Firm* — Oblon, Spivak, McClelland, Maier & Neustadt, L.L.P.

(57) ABSTRACT

An air return bulkhead may be removably mounted to the front wall of a cargo container such that the air return bulkhead is releasable and securable without the use of handheld tools. Accordingly, in various embodiments the bulkhead may be quickly and easily uninstalled and reinstalled so as to permit system maintenance, such removal of debris from a filter screen.

22 Claims, 10 Drawing Sheets

(56) References Cited

U.S. PATENT DOCUMENTS

| | | |
|---|---|---|
| 3,297,175 A | 1/1967 | Gooding |
| 3,308,738 A | 3/1967 | Heimann |
| 3,338,187 A | 8/1967 | Moorhead et al. |
| 3,343,473 A | 9/1967 | Gillick et al. |
| 3,430,922 A | 3/1969 | Spencer |
| 3,451,357 A | 6/1969 | Barnard et al. |
| 3,499,395 A | 3/1970 | Verde |
| 3,543,951 A | 12/1970 | Marvin |
| 3,570,414 A | 3/1971 | Miller |
| 3,602,474 A | 8/1971 | Deering |
| 3,637,094 A | 1/1972 | Grey |
| 3,645,214 A | 2/1972 | McLaughlin |
| 3,699,898 A | 10/1972 | Nolan |
| 3,779,174 A | 12/1973 | Doyle et al. |
| 3,791,311 A | 2/1974 | Loomis |
| 3,866,544 A | 2/1975 | Rothell |
| 3,951,284 A | 4/1976 | Fell et al. |
| 3,992,892 A | 11/1976 | Sain et al. |
| 4,027,892 A | 6/1977 | Parks |
| 4,111,481 A | 9/1978 | Nix et al. |
| 4,143,588 A | 3/1979 | Exler |
| 4,161,335 A | 7/1979 | Nix et al. |
| 4,181,349 A | 1/1980 | Nix et al. |
| 4,245,863 A | 1/1981 | Carter |
| 4,279,439 A | 7/1981 | Cantieri |
| 4,311,420 A | 1/1982 | Hendricks et al. |
| 4,334,812 A | 6/1982 | Delatush |
| 4,358,233 A | 11/1982 | Morris et al. |
| 4,361,014 A | 11/1982 | Blain |
| 4,396,325 A | 8/1983 | Joice-Cavanagh |
| 4,399,737 A | 8/1983 | Severson |
| 4,436,466 A | 3/1984 | Marino |
| 4,441,333 A | 4/1984 | Mayer |
| 4,456,415 A | 6/1984 | Joice-Cavanagh |
| 4,459,821 A | 7/1984 | Cabell et al. |
| D277,312 S | 1/1985 | Williamson et al. |
| 4,495,857 A | 1/1985 | Morgan |
| D277,502 S | 2/1985 | Williamson et al. |
| 4,498,824 A | 2/1985 | Kinkle |
| 4,539,239 A | 9/1985 | Graves et al. |
| 4,565,071 A | 1/1986 | Bartling et al. |
| D284,213 S | 6/1986 | Morgan |
| D284,996 S | 8/1986 | Bergdahl |
| D285,963 S | 9/1986 | Morgan |
| 4,726,196 A | 2/1988 | Zajic |
| 4,800,733 A | 1/1989 | Strobel et al. |
| 4,801,169 A | 1/1989 | Queen et al. |
| RE33,200 E | 4/1990 | Reynolds et al. |
| 4,961,677 A | 10/1990 | Downard, Jr. |
| 5,007,670 A | 4/1991 | Wise |
| 5,010,943 A | 4/1991 | Boyer |
| 5,033,537 A | 7/1991 | Atkin et al. |
| 5,054,295 A | 10/1991 | Goulooze |
| 5,129,235 A | 7/1992 | Renken et al. |
| 5,164,238 A | 11/1992 | Horiki et al. |
| 5,167,433 A | 12/1992 | Ryan |
| 5,360,304 A | 11/1994 | Notaro et al. |
| 5,372,397 A | 12/1994 | Arndt |
| 5,427,237 A | 6/1995 | Kiefer et al. |
| D367,830 S | 3/1996 | Brys |
| 5,678,421 A | 10/1997 | Maynard et al. |
| 5,735,564 A * | 4/1998 | Coogan .................. 296/24.43 |
| 5,795,007 A | 8/1998 | Yamamoto |
| 5,807,046 A | 9/1998 | Onken |
| RE36,214 E | 6/1999 | Podd, Sr. et al. |
| 5,947,812 A | 9/1999 | Henning et al. |
| 5,993,310 A | 11/1999 | Onken |
| 6,116,044 A | 9/2000 | Gothier |
| 6,203,419 B1 | 3/2001 | Onken |
| 6,296,561 B1 | 10/2001 | Ziegler et al. |
| 6,364,388 B1 | 4/2002 | Ziegler et al. |
| 6,470,692 B1 | 10/2002 | Ziegler et al. |
| 6,508,076 B1 | 1/2003 | Gast et al. |
| 6,626,753 B2 | 9/2003 | Onken |
| 6,827,534 B2 | 12/2004 | Onken |
| 6,945,865 B1 | 9/2005 | Turek |
| 2003/0090119 A1 * | 5/2003 | Bateman .................. 296/24.1 |

OTHER PUBLICATIONS

Trade Literature describing the FG Products Return Air Bulkhead, believed to have been publicly available on or before Mar. 25, 2004.

Trade Literature describing the Thermo King "Smart Reefer" Model SB-III SR®, believed to have been publicly available on or before Mar. 25, 2004.

Trade Literature describing the Air Flo Products Airhead Bulkhead, believed to have been publicly available on or before Mar. 25, 2004.

Trade Literature describing the Thermo King SB-III Max+, believed to have been publicly available on or before Mar. 25, 2004.

Trade Literature describing the Aero Bulkheads, believed to have been publicly available on or before Mar. 25, 2004.

Trade Literature describing the Donovan Enterprises Return Air Bulkhead, believed to have been publicly available on or before Mar. 25, 2004.

Trade Literature describing the Thermo King Super II Max+, believed to have been publicly available on or before Mar. 25, 2004.

Trade Literature describing the Thermo King "Smart Reefer" Super-II SR, believed to have been publicly available on or before Mar. 25, 2004.

Trade Literature describing AAA Design Single Finger Ducts, believed to have been publicly available on or before Mar. 25, 2004.

* cited by examiner

AIR RETURN BULKHEAD WITH QUICK RELEASE MOUNTING SYSTEM

CROSS-REFERENCE TO RELATED APPLICATIONS

This application is a continuation application of U.S. application Ser. No. 10/809,286, filed on Mar. 25, 2004, which is herein incorporated by reference in its entirety.

TECHNICAL FIELD

This relates to temperature control systems, and more particularly to controlling airflow in a temperature control system.

BACKGROUND

Temperature-controlled cargo containers, such as refrigerated trailers, are commonly used to transport food products and other temperature-sensitive products. A refrigerated trailer generally includes a refrigeration unit mounted to the front wall of the trailer with inlet and outlet portions protruding into the interior of the trailer. The outlet of the refrigeration unit forces cooled air into the trailer near the ceiling of the trailer, thus causing the cooled air to cycle through the trailer. The inlet of the refrigeration unit is positioned below the outlet in order to receive air that has cycled though the trailer. In some circumstances, the cooled air from the outlet may "short cycle" and not flow sufficiently to the rear of the trailer, which can causes a substantial temperature gradient in the trailer. To prevent the cooled air from leaving the outlet of the refrigeration unit and short cycling immediately to the inlet, a duct system may be installed along the ceiling of the trailer and an air return bulkhead may be installed on the front wall. The duct system guides the cooled air from the outlet of the refrigeration unit toward the rear portion of the trailer. The air return bulkhead effectively funnels the air near the floor of the trailer to the inlet of the refrigeration unit, reducing the likelihood that the cooled air forced from the outlet near the ceiling will short cycle to the inlet.

Typically, air return bulkheads are mounted to the front wall of the trailer using rivets or screws. Installation or removal of these bulkheads requires the use of handheld tools such as drills and fastener drivers. Conventional bulkheads rely on this method of installation primarily due to its simplicity and low cost.

However, as the air return bulkhead guides the cycled air from the floor of the trailer to the inlet of the refrigeration unit, debris and other objects may become lodged in a filter disposed in the bulkhead plenum or at the inlet of the refrigeration unit. This debris may restrict the airflow path and thereby reduce the efficiency and effectiveness of the temperature control system. More significantly, however, the presence of debris minimizes the heat transfer in the refrigeration unit and thus places the unit under considerable strain. The refrigeration unit may fail if such a condition persists, which in turn may necessitate costly repairs.

To remove the debris and clean out the air return path in the bulkhead (or to perform maintenance and repair at the inlet of the refrigeration unit), the bulkhead or a substantial portion thereof is removed from front wall of the trailer. The removal or disassembly of the bulkhead is often time-consuming and inconvenient, as it commonly involves the use of handheld tools and the removal of multiple fasteners.

SUMMARY

An air return bulkhead may be removably mounted to the front wall of a cargo container such that the air return bulkhead is releasable and securable without the use of handheld tools. Accordingly, in various embodiments the bulkhead may be quickly and easily uninstalled and reinstalled so as to permit system maintenance, such removal of debris from a filter screen.

In one embodiment, a system may include a cargo container having an interior at least partially defined by a front wall and sidewalls. A temperature control unit may be mounted to the front wall and has an air return inlet facing the interior of the cargo container. An air return bulkhead may guide air toward the inlet temperature control unit. The bulkhead may be mounted so that it can be readily removed and reinstalled without the use of tools.

In another embodiment, an air return bulkhead may include a peripheral portion that is adapted to abut a wall. A face panel may be offset from the peripheral portion such that a space is defined between the wall and the face panel when the peripheral portion abuts the wall. The bulkhead may further include a toolless mounting means for retaining the peripheral portion in abutment with the wall.

In a further embodiment, a bulkhead includes a peripheral portion that is adapted to abut a wall and a support portion that is adapted to abut the wall. A face panel may be offset from the peripheral portion such that a space is defined between the wall and the face panel when the peripheral portion abuts the wall. The bulkhead may also include at least one rib formed in the face panel. The rib may at least partially define a portion of the face panel that is operable to receive a strap. The bulkhead may further include at least one slot formed in the bulkhead. The slot may be operable to receive a flange that extends from the wall. In one aspect, the bulkhead may be mountable to the wall without the use of handheld tools when the slot receives the flange and the face panel receives the strap.

The details of various embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION OF ILLUSTRATIVE EMBODIMENTS

Figure 1:
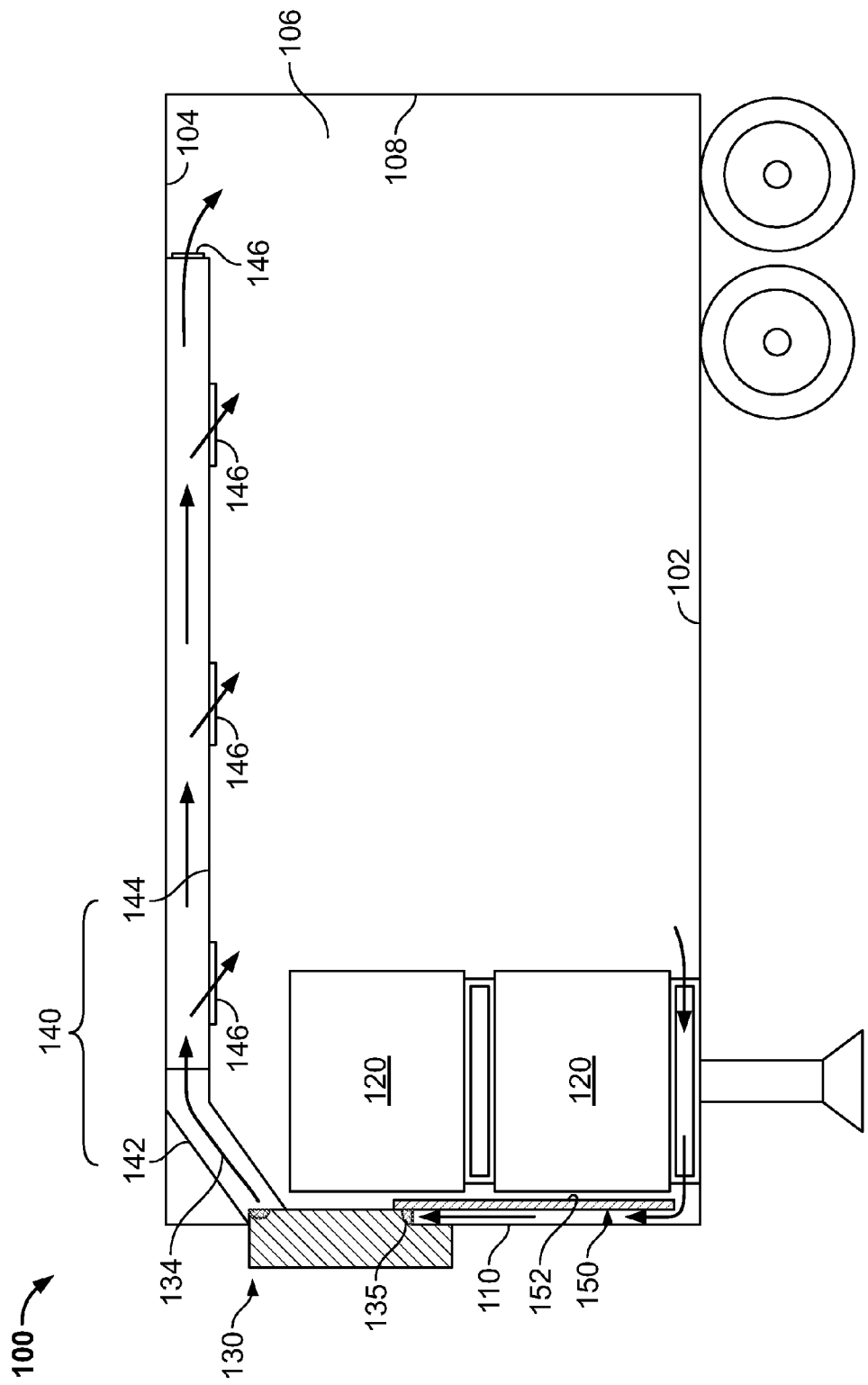
FIG. 1 is a cross-sectional view of a cargo container having a temperature control system.

Referring to FIG. 1, a cargo container includes a temperature control system that is capable of controlling the air temperature within the container. The cargo container is shown as a trailer 100, but any other cargo container, such as a railroad cargo car or a sea vessel transport, may include such a temperature control system in accordance with various embodiments of the invention. The trailer 100 includes a floor 102, a ceiling 104, sidewalls 106, a rear wall 108, and a front wall 110. The rear wall 108 may include an entrance such that cargo 120 may be loaded into and unloaded from the trailer 100.

The cargo 120 may be temperature-sensitive, or regulations may require that the cargo 120 be transported in the trailer 100 at a particular temperature. For example, fresh produce is usually transported at cooler temperatures in order to maintain freshness or impede degradation. In such circumstances, the trailer 100 includes a temperature control system that may have one or more of the following: a temperature control unit 130, a duct system 140, and an air return bulkhead 150. The temperature control system operates to cycle air through the trailer 100 such that the air in the trailer is within a predetermined temperature ranged. In one example, temperature control unit 130 may force cool air throughout the trailer 100 to maintain the air temperature in the trailer 100 at a desired temperature.

Still referring to FIG. 1, the temperature control unit 130 includes an outlet 134 to force conditioned air into the trailer 100 and an inlet 135 to receive air that is returning from within the trailer 100. The temperature control unit 130 is mounted to the front wall 110 of the trailer 130, and at least a portion 132 of the unit 130 (including the inlet 135 and the outlet 134) faces or protrudes into the trailer. In some embodiments, the temperature control unit 130 is a refrigeration unit that includes an evaporator to cool the air before it is forced from the outlet 134 into the trailer.

The duct system 140 includes a transition duct 142 and one or more duct pieces 144. The transition duct 142 is mounted to the ceiling 104 and surrounds the outlet 134 of the temperature control unit 130. The transition duct 142 operates to guide the air forced from the outlet 134 to the duct pieces 144 mounted along the ceiling 104. The duct pieces 144 may include one or more vents 146 to output the air in various parts of the trailer 100. For example, the temperature control unit 130 may force conditioned air from the outlet 134 where the transition duct 142 guides the conditioned air to the duct pieces 144 along the ceiling 104 of the trailer 100. As the conditioned air passes through the transition duct 142 and the duct pieces 144, the conditioned air enters into the trailer 100 through the vents 146 that are incrementally positioned in the duct pieces 144. The conditioned air is dispersed from the near the ceiling 104 of the trailer 100 and may pass all the way to the rear portion of the trailer 100, thus reducing the likelihood of short cycling.

Still referring to FIG. 1, the air return bulkhead 150 is removably mounted to the front wall 110 of the trailer 100 such that it guides air to the inlet 135 of the temperature control unit 130. The air return bulkhead 150 includes a face panel 152 that is offset from the front wall 110 when the bulkhead 150 is properly mounted to the front wall 110. As such, air may flow in the space between the face panel 152 and the front wall 110 toward the inlet 135 of the temperature control unit 130. As shown in FIG. 1, the bulkhead 150 may be mounted to the wall 110 in an elevated position above the trailer floor 102 so that a gap exists between the bulkhead 150 and the trailer floor 102. The bulkhead 150 operates to guide air from near the floor 102 of the trailer 100 to the inlet 135 of the temperature control unit 130. Because the air from the outlet 134 is forced out near the ceiling 104 of the trailer 100, the air return bulkhead 150 reduces the likelihood of short cycling by returning air that has been cycled to the floor 102 toward the inlet 135.

Figure 2:
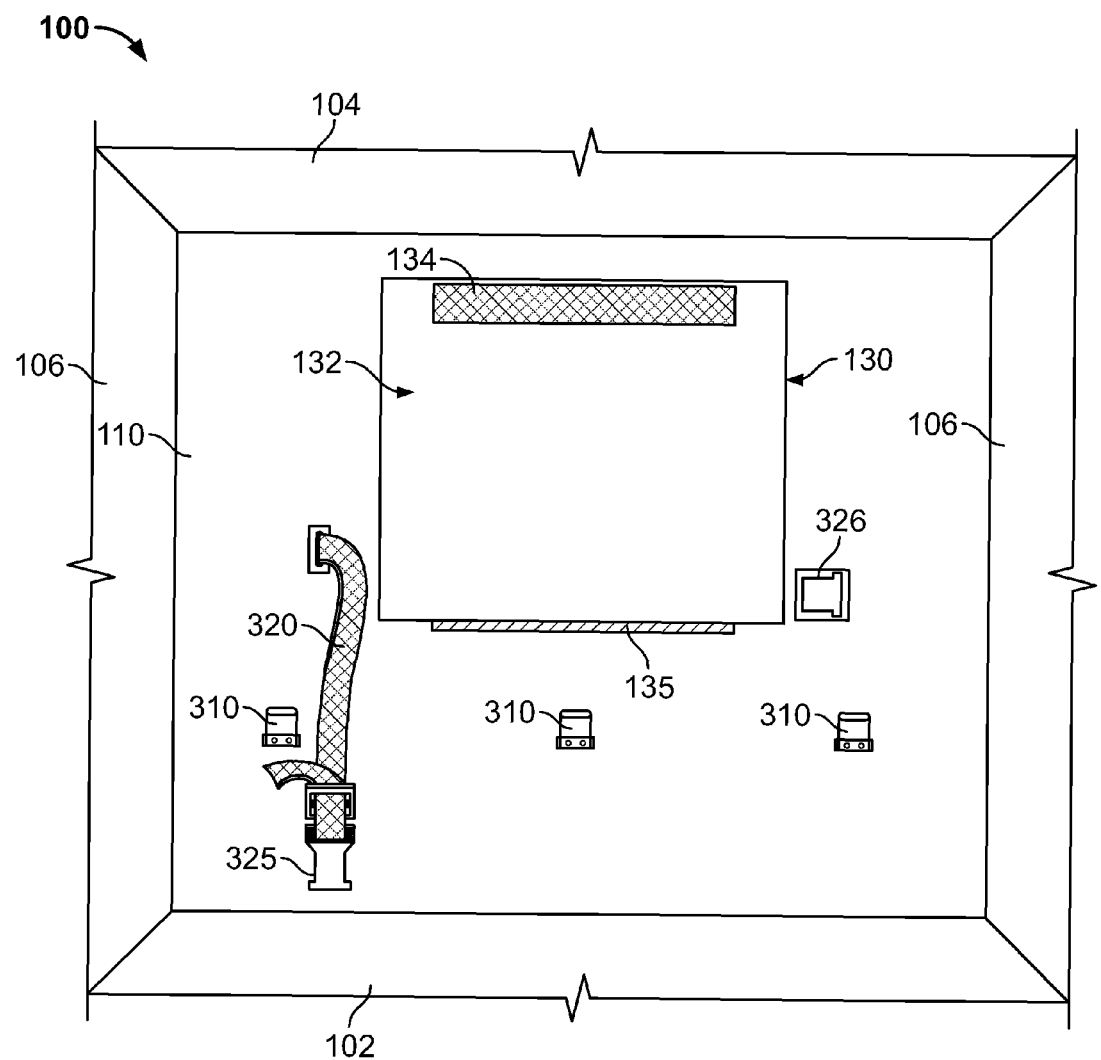
FIG. 2 is a view of the front wall from inside the cargo container of FIG. 1, with the bulkhead and transition duct removed.

FIG. 2 shows a view of the front wall 110 from inside the trailer 100 with the cargo 120, the duct system 140, and the air return bulkhead 150 removed. The temperature control unit 130 is mounted to the front wall 110 such that an interior portion 132 of the temperature control unit 130 faces or protrudes toward the interior of the trailer 100. The outlet 134 is positioned near the ceiling 104 of the trailer 100, and the inlet 135 is positioned closer to the floor 102. In some embodiments, the temperature control unit 130 is mounted to support posts (not shown in FIG. 2) in the front wall 110, which provide structural support for holding the weight of the temperature control unit 130. These support posts may be internally embedded in the front wall 110 such that the posts are not viewable from inside the trailer 100.

Still referring to FIG. 2, one or more mounting flanges 310 may be secured to the front wall 110 or to the support posts in the front wall 110 of the trailer 100. Similarly, a strap 320 may be secured to the front wall 110 or to the support posts in the front wall 110. As explained below, the flanges 310 and the strap 320 are adapted to receive an air return bulkhead that is removable without the use of handheld tools.

Figure 3:
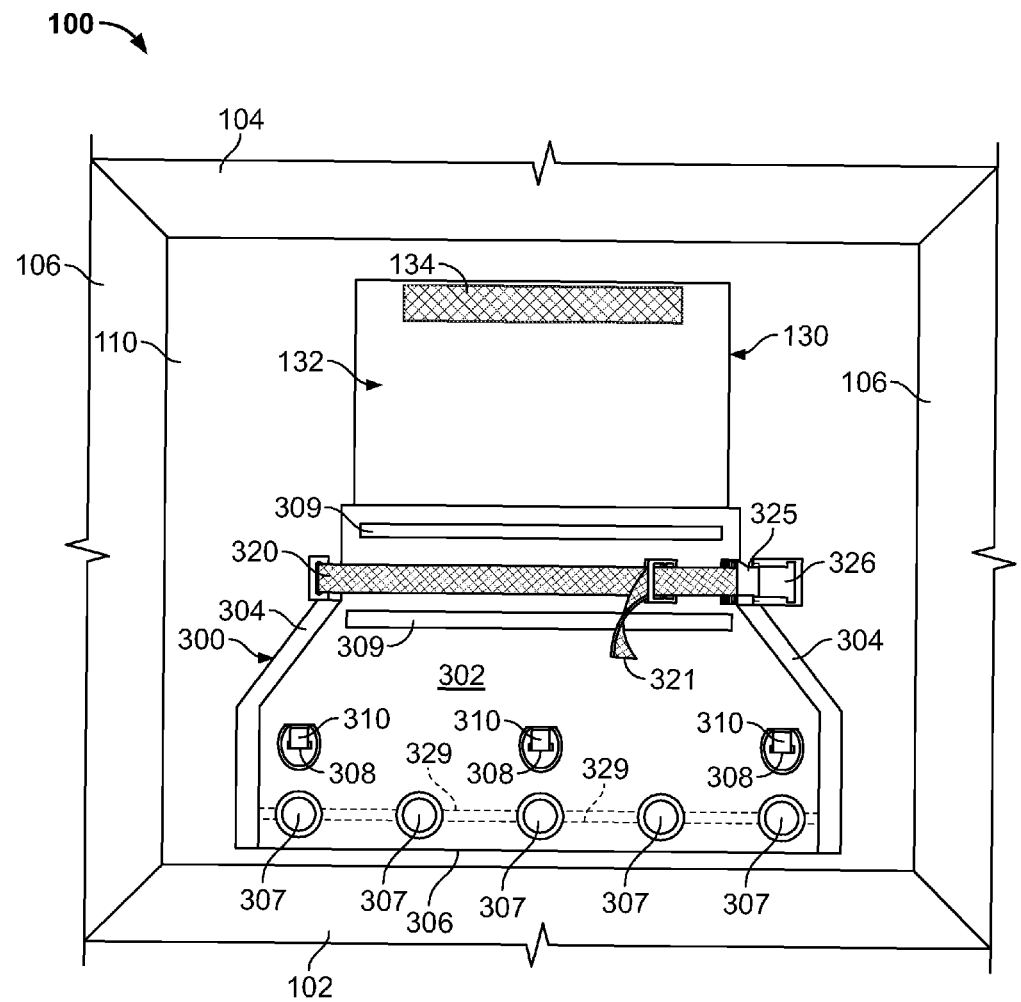
FIG. 3 is a view of the front wall from FIG. 2 with an air return bulkhead mounted to the front wall in accordance with an embodiment of the invention.

FIG. 3 shows an air return bulkhead 300 removably mounted to the front wall 110 of the trailer 100 in accordance with an embodiment of the invention. Although a transition duct (e.g., element 142 in FIG. 1) may partially or completely surround the outlet 134 of the temperature control unit 130, the transition duct is not shown in FIG. 3 so as to more clearly show the interior portion 132 of the temperature control unit 130. The air return bulkhead 300 may comprise any material that is sufficiently durable in the temperature-controlled environment. For example, the bulkhead 300 may comprise high-density polyethylene or fiberglass. If the bulkhead 300 comprises a plastic material, the bulkhead 300 may be formed using known vacuum forming methods.

As shown in FIG. 3, the air return bulkhead 300 is mounted to the front wall 110 such that it abuts at least a portion of the interior portion 132 of the temperature control unit 130. When the bulkhead 300 is properly mounted to the front wall 110 of the trailer, one or more peripheral portions 304 may be abutted against the front wall 110. In the embodiment shown in FIG. 3, the peripheral portions 304 extend substantially along the side edges of the bulkhead 300, but a peripheral portion 304 need not extend the full length of an edge. The peripheral portions 304 form a seal with the front wall 110 (and/or the interior portion 132), thereby preventing a substantial amount of air from seeping in or out along the peripheral portions 304. A face panel 302 of the air return bulkhead 300 is offset from the peripheral portions 304 such that a space exists between the front wall 110 and the face panel 302. The mounted bulkhead 300 includes at least one air return channel or port 306 near the floor 102 of the trailer. As shown in FIG. 3, the bulkhead 300 may be mounted to the wall 110 in a elevated position above the floor 102 so that in this embodiment, the ports 306 face generally toward the floor 102. The ports 306 permit air to flow into the space between the face panel 302 and the front wall 110 and to flow toward the inlet 135 of the temperature control unit 130. One or more support portions 307 are formed in the air return bulkhead 300 such that the support portions 307 are offset from the face panel 302 (also shown in FIG. 4) and abut against the front wall 110 of the trailer 100. The support portions 307 provide structural support for the bulkhead 300 and reduce the likelihood of bending or cracking when cargo is pressed against the face panel 302.

The air return bulkhead 300 includes a lower end that is wider than the upper end. The upper end spans across the interior portion 132 of the temperature control unit 130 and surrounds at least a portion of the inlet 135 (FIG. 2). In this embodiment, the face panel 302 at the upper end of the bulkhead 300 extends substantially parallel to and abuts against the interior portion 132 of the temperature control unit 130. The lower end of the bulkhead 300 extends substantially from one sidewall 106 of the trailer 100 to the opposing sidewall 106. This increases the amount of return airflow pathways near the floor 102 because the air return port 306 may receive air proximal to each sidewall 106 of the trailer 100 in addition to receiving air from proximal to the central portion floor 102.

Referring again to FIG. 3, the air return bulkhead 300 also includes a filter element 329. The filter element may be a wire mesh, a plastic screen, or other filter suitable to prevent debris from entering the refrigeration unit. Multiple discrete filter elements may span the gaps between support portions 307 in the plenum area, as shown in FIG. 3. Alternately, a single filter element may be disposed across the entire plenum or opening 306. The filter element may be integrally molded with or affixed to the face panel by adhesives, rivets, fasteners, or other suitable means.

The air return bulkhead 300 is toollessly mounted to the front wall 110 of the trailer 100. In other words, the bulkhead 300 may be mounted to (and removed from) the front wall 110 without the use of handheld tools, such as an air-powered rivet gun or a screwdriver device. In the embodiment shown in FIG. 3, the air return bulkhead 300 is toollessly mounted to the front wall 100 using a strap 320 and mounting flanges 310. In other embodiments, however, the bulkhead 300 may be toollessly mounted to the front wall 110 using one or more straps 320, one or more flanges 310, one or more toolless brackets or connectors, or any combination thereof. Because the air return bulkhead 300 may be quickly mounted to and removed from the front wall 110, a significant amount of maintenance/repair time may be saved by using such a bulkhead 300 in a trailer 100 or other cargo container. Moreover, because the air return bulkhead 300 is toollessly mounted to the front wall 110, the trailer operator does not have to wait until the proper handheld tools are available to gain access to the interior side of the bulkhead 300 or the inlet 135 of the temperature control unit 130.

Figure 4:
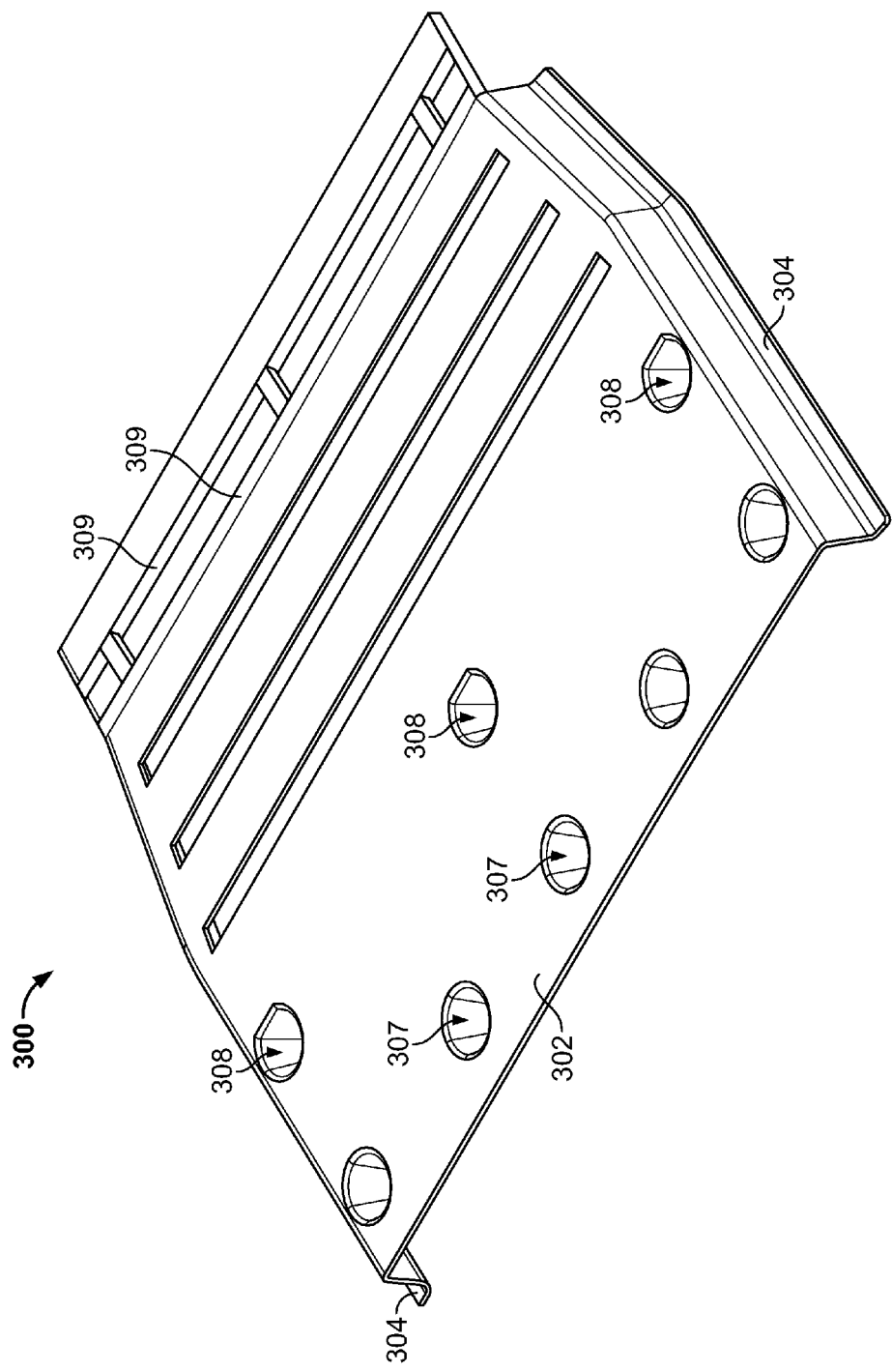
FIG. 4 is a perspective view of the air return bulkhead of FIG. 3.

Referring now to FIGS. 3 and 4, each flange 310 is passed through a corresponding slot 312 in an offset portion 308. The tip of each flange may contact a wall of the corresponding offset portion 308 such that the flanges 310 support the bulkhead 300. For example, as shown in FIG. 3, the flanges 310 may at least partially support the bulkhead 300 in an elevated position above the trailer floor 102. The flanges 310 may extend from the front wall 110 such that the peripheral portions 304 and the support portions 307 are abutted against the front wall 110 while the face panel 302 and the offset portions 308 are spaced apart from the wall. In some embodiments, the peripheral portions 304 may include a gasket that is positioned between the peripheral portions 304 and the front wall 110 so as to form a sufficient seal.

In addition, the air return bulkhead 300 is retained against the front wall 110 by the strap 320 that extends across the floating surface 302 of the bulkhead 300 and connects to a receptacle 326 using a buckle 325. A loose end 321 of the strap 320 may be pulled to pressure the bulkhead 300 against the front wall 110 and the interior portion 132. The strap 320 may use any connection means other than a buckle 325 and receptacle 326 so as to support the bulkhead 300 against the front wall 110. A portion of the face panel 302 may be specially adapted to receive the strap 320. For example, that portion of the face panel 302 may include ribs 309 that slightly protrude from the surface of the face panel 302 (as perhaps best shown in FIG. 4) and guide the proper placement of the strap 320. In another example, that portion of the face panel 302 may be textured or sized appropriately to receive the strap 320. Neither the flanges 310 nor the strap 320 require the use of handheld tools when mounting or removing the air return bulkhead 300 to the front wall 110, thus permitting the bulkhead 300 to be toollessly mounted to (and removed from) the front wall 110 of the trailer 100.

Figure 6:
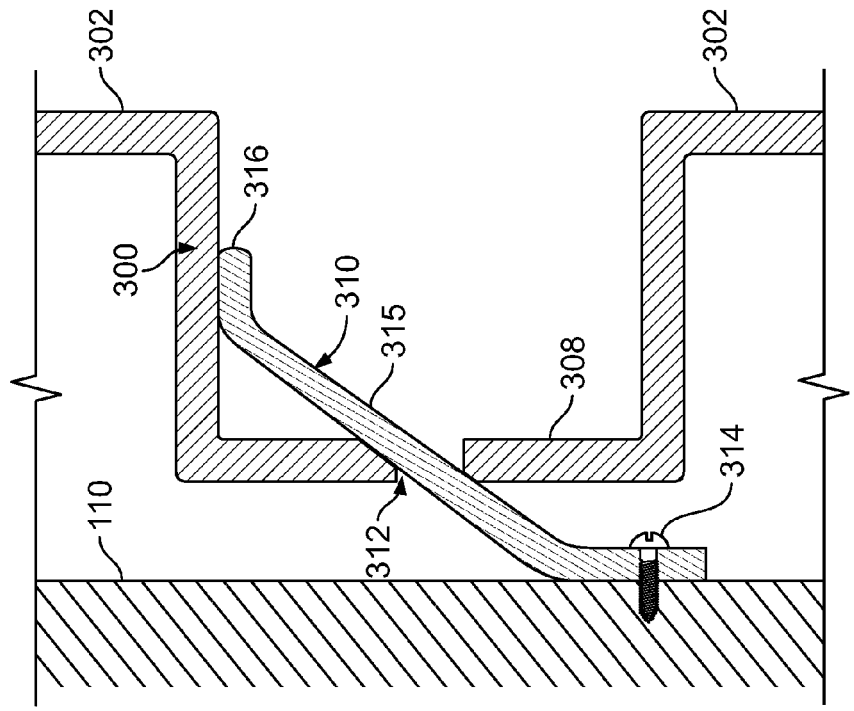
FIG. 6 is a cross-sectional view of the portion of the bulkhead from FIG. 4.
Figure 5:
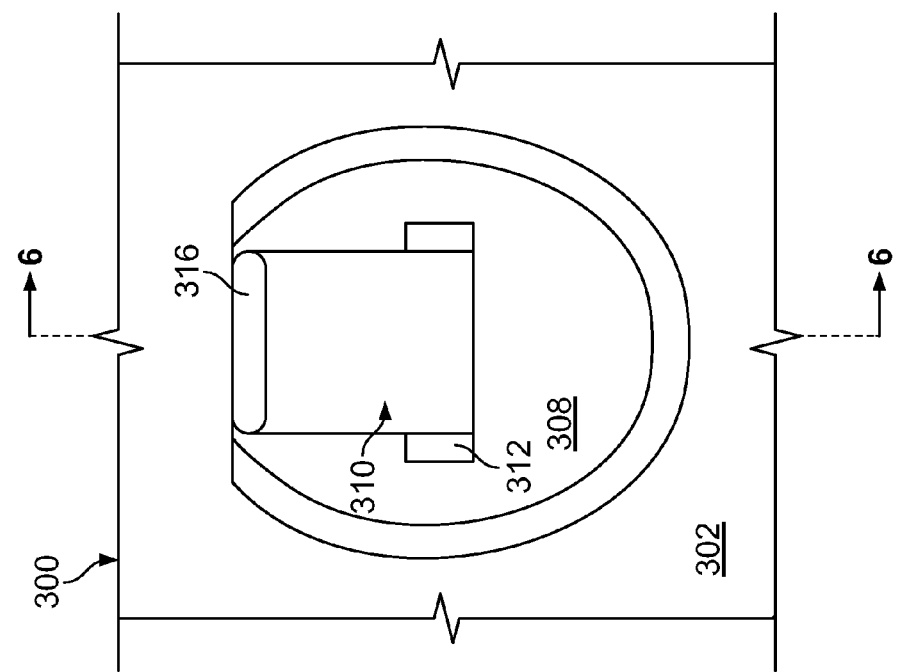
FIG. 5 is a close-up view of a portion of the air return bulkhead of FIG. 3.

FIG. 5 shows a close-up view of the flange 310 and the offset portion 308 of the air return bulkhead 300. FIG. 6 shows a cross-section view of that flange 310 and that portion 308. The flange 310 is mounted to the front wall 110 of the trailer 100 using a fastener 314 or other attachment means so that a gap exists between an angled portion 315 of the flange 310 and the front wall 110. In other embodiments, the flange 310 may be integral with the front wall 110 with a portion of the flange 310 extending outward from the front wall 110. The bulkhead 300 is toollessly mounted to the front wall 110 by maneuvering the tip 316 of the flange 310 through the slot 312. The angled portion 315 is then passed through the slot 312 such that at least a portion of the bulkhead 300 is maintained between the angled portion 315 and the front wall 110. In this embodiment, the angled portion 315 extends from the front wall 110 at an upward angle so that the bulkhead 300 is increasingly compelled toward the front wall 110 as the bulkhead 300 is lowered. The offset portion 308 does not necessarily contact the front wall 110 because the offset portion 308 is positioned closer to the face panel 302 than the support portions 307 and the peripheral portions 304. Thus, the peripheral portions 304 may form a sufficient seal with the front wall 110 even though the offset portion 308 does not abut the wall 110 when mounted on the flanged 310.

Figure 7:
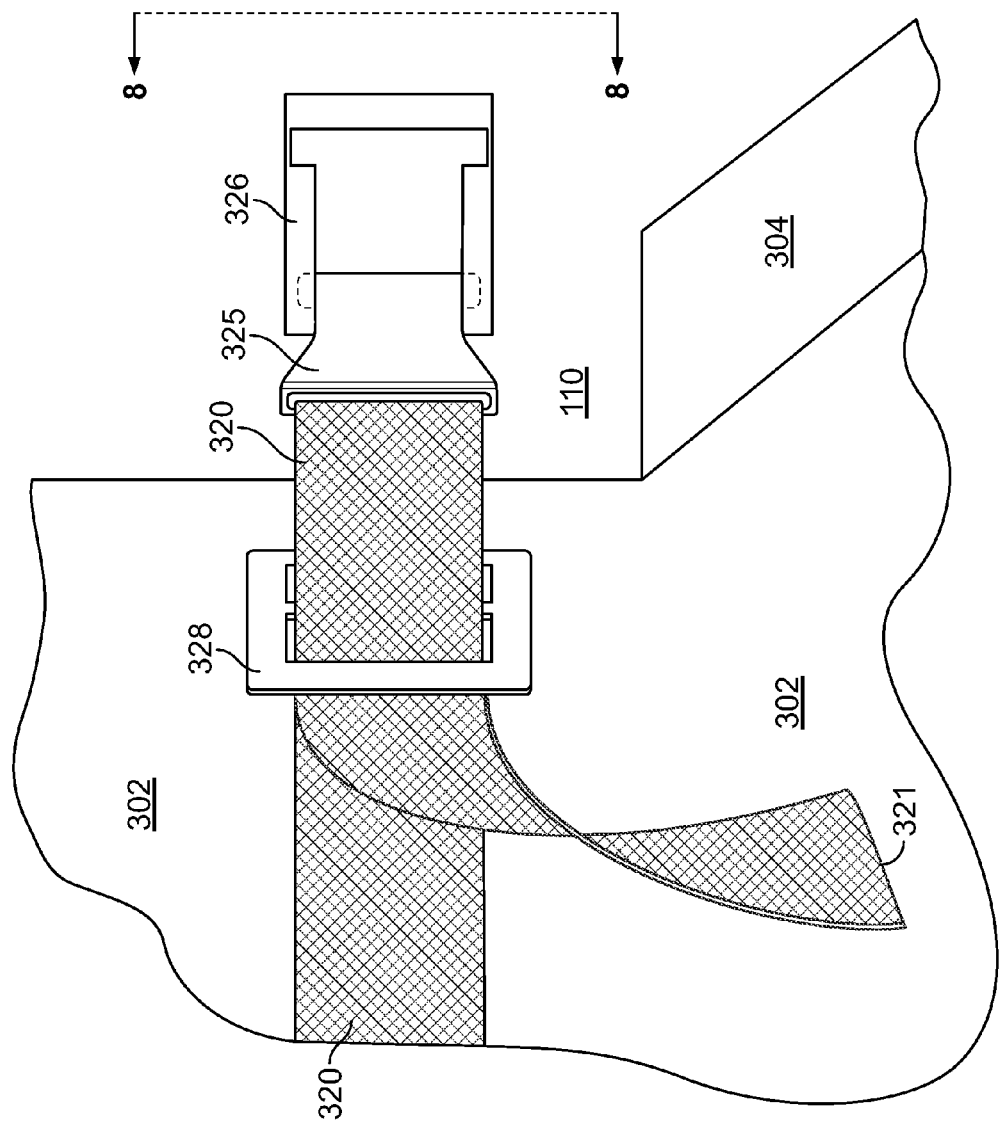
FIG. 7 is a close-up view of another portion of the air return bulkhead of FIG. 3.
Figure 8:
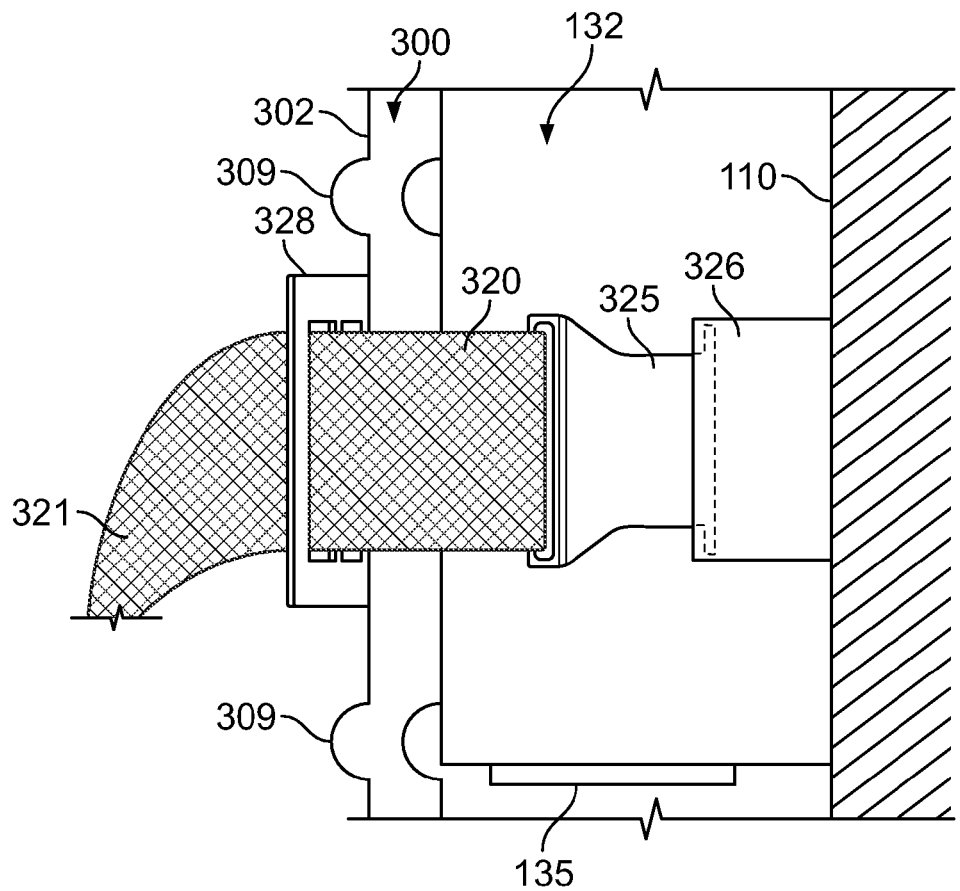
FIG. 8 is a side view of the portion of the bulkhead from FIG. 6.

Referring to FIGS. 7-8, the strap 320 extends across at least a portion of the face panel 302 and connects to the receptacle 326. The receptacle 326 may include any device or mechanism to interlock with the buckle 325 or other connection means of the strap 320. In one example, the buckle 325 and receptacle 326 may be a track fitting combination provided by Kinedyne Corporation of Lawrence, Kans. The receptacle 326 may be mounted to the front wall 110 using any attachment means. The bulkhead is toollessly mounted to the front wall 110 by extending the strap 320 along the face panel 302 and connecting the buckle 325 to the receptacle 326. This portion of the face panel 302 includes ribs 309 that slightly protrude from the face panel 302 and guide the proper placement of the strap 320. When the buckle 325 is connected to the receptacle 326, the loose end 321 of the strap 320 may be pulled upon to force the face panel 302 against the interior portion 132 of the temperature control unit 130. The strap 320 may include a guide piece 328 so as to guide the movement of the strap 320 as the loose end 321 is pulled upon.

In operation, the foregoing structures provide a quick release functionality which permits the bulkhead to be easily removed from and reinstalled on the wall of the trailer without the use of handheld tools. That, in turn, permits an operator to quickly and efficiently clean or repair the filter element 329. This functionality also advantageously permits the bulkhead to be easily replaced in the event that it is damaged by, for instance, a forklift during a loading or unloading operation.

Although the bulkhead 300 depicted in FIGS. 3 and 4 is toollessly mounted to the front wall 110 using mountings flanges 310 and a strap 320, other embodiments are not limited to such a combination. For example, the air return bulkhead include a set of tongues that correspond to a set of grooves formed the front wall 110 (or vice versa), thus permitting the bulkhead to be toollessly mounted to the front wall when the tongues are interfaced with the corresponding grooves.

In other embodiments the bulkhead may be toollessly mounted to the front wall 110 using toolless connectors or brackets. For example, the bulkhead may include a plurality of spring-loaded reciprocating devices along the peripheral portions such that the bulkhead may be snapped into position against the front wall 110. In a further example, the bulkhead may fit onto at least one threaded stud extending from the front wall of the trailer. The threaded stud includes a manual-turn knob that screws onto the threaded portion. A corresponding hole in the bulkhead is capable of receiving the threaded stud such that the knob may be manually screwed onto the threaded stud to secure the bulkhead against the front wall.

Figure 10:
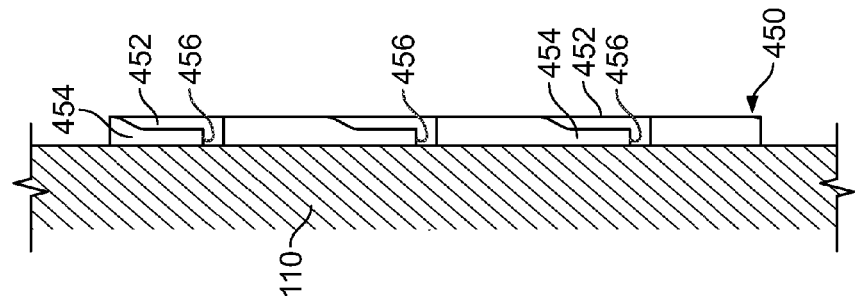
FIG. 10 is a side view of the bracket of FIG. 9.
Figure 9:
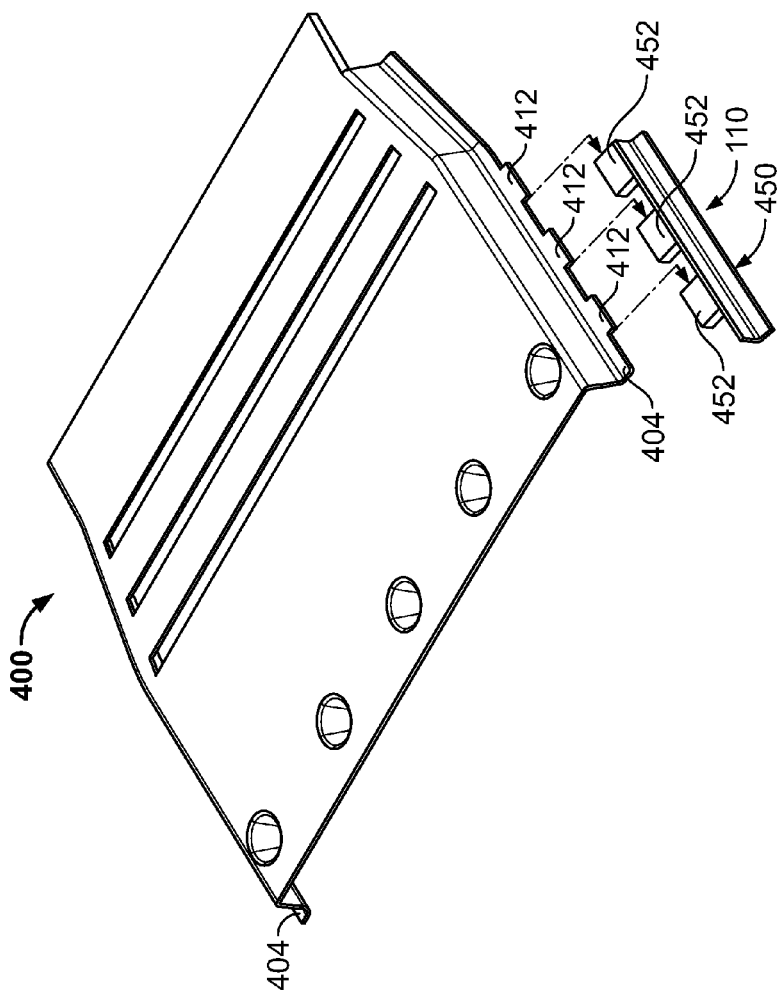
FIG. 9 is a perspective view of a bracket for mounting an air return bulkhead to a wall.

In yet another example, FIGS. 9-10 show a bracket 450 that may be fastened to or integrally form with the front wall 110. The bracket 450 includes one or more guide portions 452 that define channels 454 between the guide portions 452 and the front wall 110. The guide portions 452 are adapted to receive tongue portions 412 that extend from the peripheral portions 404 of the air return bulkhead 400. One bracket 450 may be positioned on each of the two sides of the bulkhead 400. As such, the bulkhead 400 may be toollessly mounted to the front wall 110 by moving each tongue portions 412 into the corresponding channel 454 where the tongue portion 412 abuts the guide stop 456, thus causing the peripheral portions 404 to supported against the front wall 110.

Figure 11:
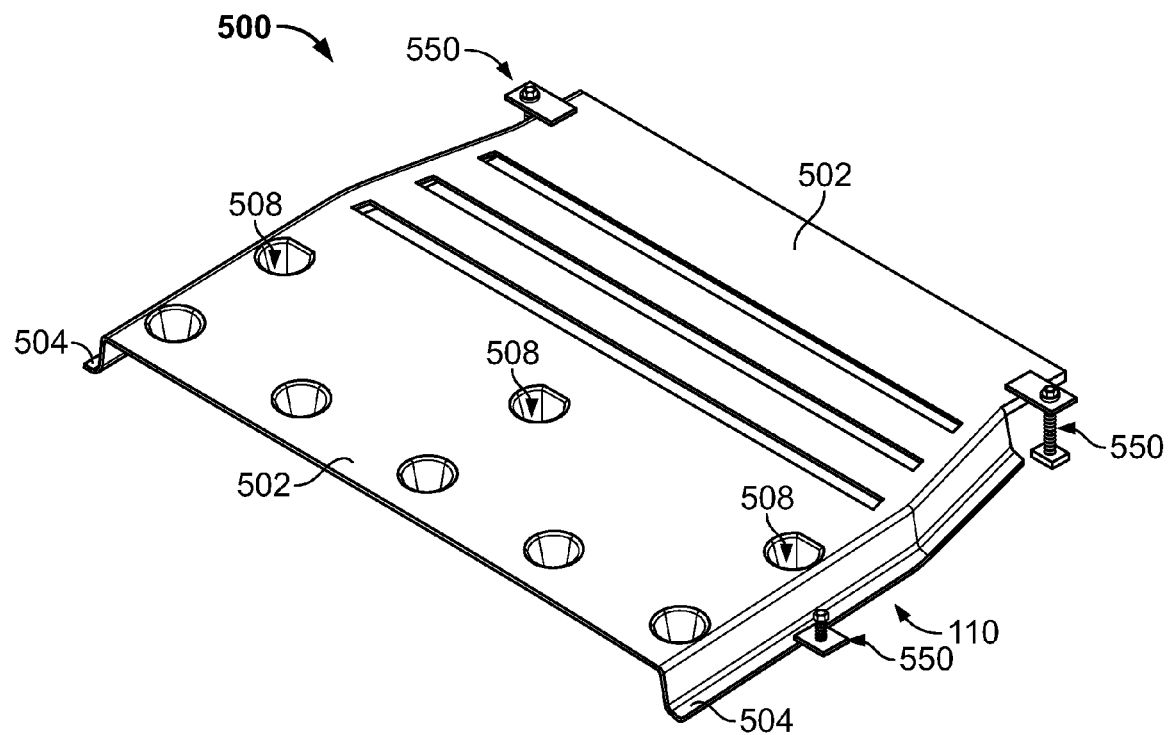
FIG. 11 is a perspective view of connectors for mounting an air return bulkhead to a wall.
Figure 12:
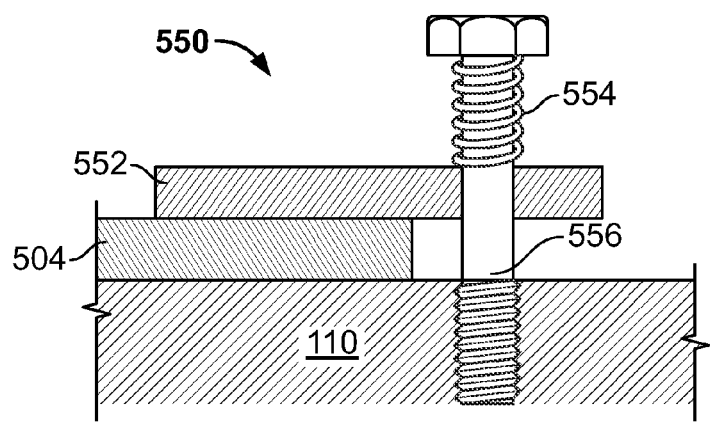
FIG. 12 is a cross-sectional view of one connector from FIG. 11.

In a further example, FIGS. 11-12 show toolless connectors 550 that may be used to support the air return bulkhead 500 against the front wall 110. Similar to the bulkhead described in connection with FIGS. 3 and 4, the bulkhead 500 includes offset portions 508 for receiving flanges that extend from the front wall 110. In this embodiment, each toolless connector 550 includes a spring device 554 that presses a plate 552 against the bulkhead 500 (either the peripheral portion 504 or the face panel 502). The spring device 554 is coiled around a shaft 556 that is fastened to the front wall 110 such as by threaded interconnection. The shaft 556 may be rectangular or include a key so as to prevent the plate 552 from spinning around the shaft 556. Accordingly, the bulkhead 500 may be toollessly mounted to the front wall 110 when the flanges are guided through the offset portions 508 (in a manner similar to that previously described in connection with FIG. 3) and the toolless connectors 550 are adjusted to press against the bulkhead 500.

Figure 13:
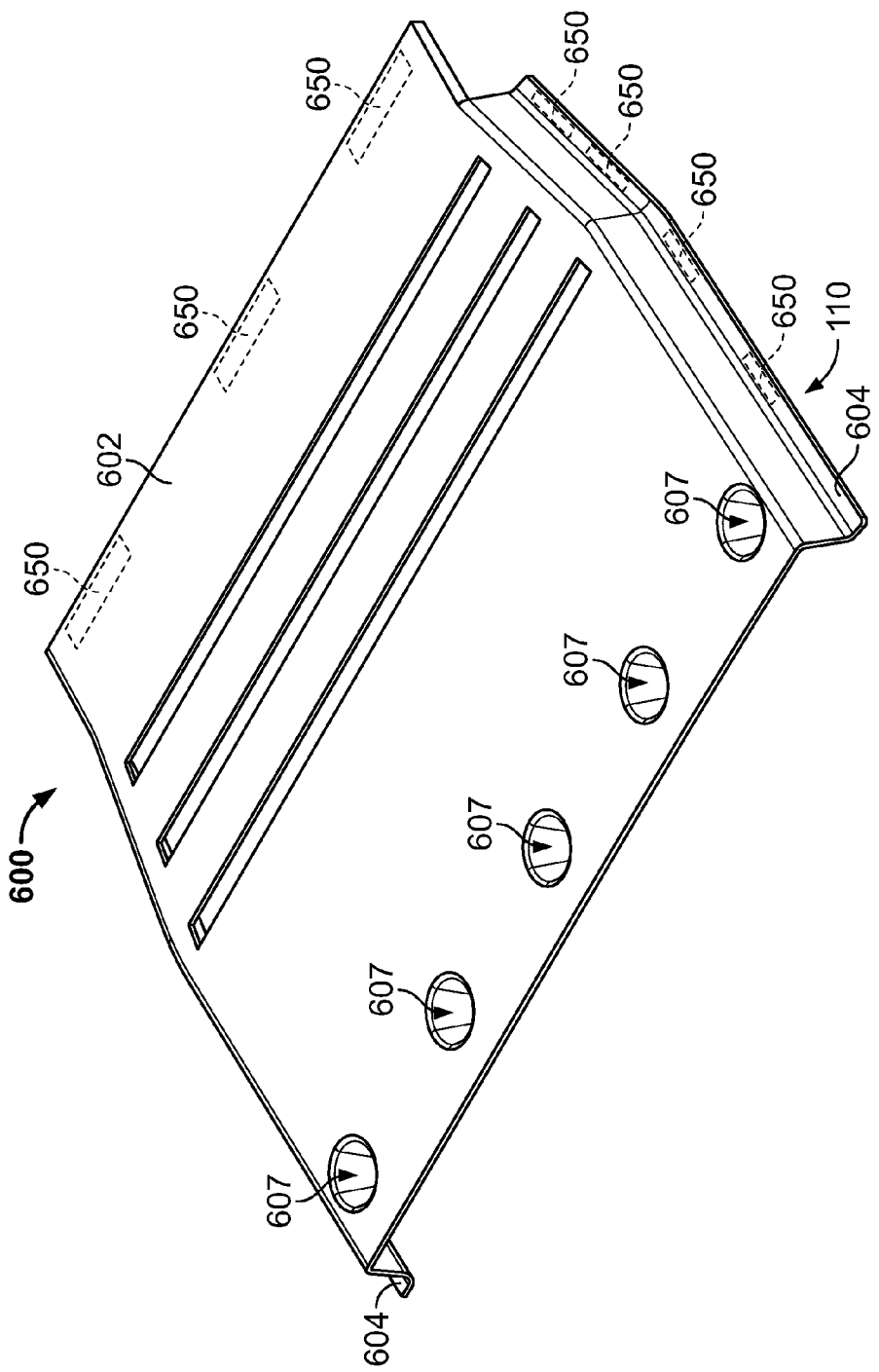
FIG. 13 is a perspective view of an air return bulkhead in accordance with another embodiment.

Referring to FIG. 13, some embodiments of an air return bulkhead 600 may include magnetic elements 650 that permit the bulkhead 600 to be toollessly mounted to the front wall 110. The magnetic elements 650 may be positioned along the peripheral portions 604 such that the peripheral portions 604 are magnetically attracted to the ferrous or magnetic portions of the front wall 110. In addition or in the alternative, magnetic elements 650 may be positioned at the base of the support portions 607 so that the support portions are compelled toward the front wall 110. Furthermore, magnetic elements 650 may be positioned in the upper portion of the face panel 602 so that the face panel is magnetically attracted toward a metallic surface of temperature control unit 130. The magnetic elements 650 may be embedded in the material of the bulkhead 600, embedded into the gasket along the peripheral portions 604, or attached to the outer surface of the bulkhead 600. In such an embodiment, the bulkhead 600 may be easily mounted into the proper position on the front wall 110 without the use of handheld tools. The bulkhead 600 may be removed from the front wall by manually pulling the bulkhead 600 away from the wall 110 to separate the magnetic elements 650 from the front wall 110.

Other embodiments of the bulkhead are secured to the front wall of the trailer with a hook-and-loop fastener system such as that sold under the tradename Velcro™. For instance, adhesive strips having hooks disposed thereon may be adhered to wall-facing side of the peripheral flange and adhesive strips having loops disposed thereto may be affixed to corresponding surfaces on the front wall of the trailer. As such, the bulkhead may be manually secured and removed from the wall without the use of handheld tools.

A number of embodiments of the invention have been described. Nevertheless, it will be understood that various modifications may be made without departing from the spirit and scope of the invention. Accordingly, other embodiments are within the scope of the following claims.

What is claimed is:

1. A method of using an air return bulkhead in a refrigerated trailer, comprising:
   releasably engaging the air return bulkhead with a plurality of mounting brackets coupled to a trailer wall by extending each of the mounting brackets through a corresponding slot in an offset portion of the bulkhead positioned in an internal portion of the bulkhead, the internal portion of the bulkhead completely surrounding the offset portion, so that a peripheral flange portion of the bulkhead is urged against the trailer wall, the mounting brackets maintaining the bulkhead in an elevated position above a trailer floor;
   releasably engaging a face panel of the bulkhead with a strap that extends from the trailer wall, the face panel being coupled to the peripheral portion to define a plenum between the face panel and the trailer wall, and the strap being adjustable to urge the peripheral flange portion of the bulkhead toward the trailer wall, wherein the bulkhead is toollessly mounted to the trailer wall in the elevated position above the trailer floor using the strap and the mounting brackets; and
   manually removing the bulkhead from the elevated position above the trailer floor without the use of handheld tools.

2. The method of claim 1, wherein the plurality of mounting brackets engage the bulkhead in a manner that compels the bulkhead against the trailer wall.

3. The method of claim 2, wherein each of the mounting brackets comprises an angled portion that extends from the trailer wall at an upward angle so that the peripheral flange portion of the bulkhead is increasingly compelled against the trailer wall as the bulkhead engages the mounting brackets.

4. The method of claim 1, wherein the bulkhead is removably mounted to the trailer wall in an orientation such that a lower panel portion of the bulkhead is substantially wider than an upper panel portion.

5. The method of claim 1, further comprising forming a seal between the peripheral flange portion and the trailer wall.

6. The method of claim 1, wherein the bulkhead defines one or more air return channels proximate to the trailer floor.

7. The method of claim 6, further comprising accessing a filter element coupled to the panel, the filter element being disposed in the plenum area and spaced apart from the air return channels proximate to the trailer floor.

8. The method of claim 1, wherein each of the mounting brackets comprises an angled portion that extends toward a tip portion offset from the trailer wall.

9. The method of claim 8, wherein the tip portion of each of the mounting brackets passes through the corresponding slot.

10. A method of installing an air return bulkhead on a trailer wall, comprising:
providing the air return bulkhead comprising a peripheral flange portion to abut the trailer wall and a panel portion to be positioned generally parallel to and apart from the trailer wall to define an air return channel between the panel portion and the trailer wall when the air return bulkhead is in an installed condition, wherein the air return bulkhead includes a plurality of mounting apertures spaced apart from the trailer wall when the air return bulkhead is in the installed condition and wherein the air return bulkhead is manufactured of a resilient material;
releasably engaging the mounting apertures with a plurality of inclined mounting brackets coupled to the trailer wall by extending each of the mounting brackets through a corresponding slot in an offset portion of the bulkhead positioned in an internal portion of the bulkhead, the internal portion of the bulkhead completely surrounding the offset portion, so that the panel portion of the air return bulkhead is pulled toward the trailer wall, thereby to urge the peripheral flange portion against the trailer wall, wherein the mounting brackets hold the air return bulkhead in an elevated position above a floor of the trailer; and
releasably engaging an upper region of the panel portion with a strap that extends from the trailer wall, the strap being adjustable to urge the peripheral flange portion of the air return bulkhead toward the trailer wall,
wherein the air return bulkhead is toollessly mounted to the trailer wall in the elevated position above the floor of the trailer using the strap and the mounting brackets and without the use of fastening devices extending through the peripheral flange portion.

11. The method of claim 10, wherein the flange peripheral portion includes no apertures through which fasteners extend.

12. The method of claim 10, wherein the mounting apertures are disposed in one or more recessed regions of the panel portion.

13. The method of claim 12, wherein each of the recessed regions extends partially from the panel portion to the trailer wall when the air return bulkhead is in the installed condition.

14. The method of claim 10, wherein the air return bulkhead further includes a filter element disposed between the panel portion and the trailer wall.

15. The method of claim 14, further comprising removing the air return bulkhead by adjusting the straps and disengaging the air return bulkhead from the mounting brackets in order to clean the filter element, said step of removing being accomplished without actuation of a fastening device extending through the peripheral flange portion.

16. The method of claim 15, further comprising reinstalling the air return bulkhead by engaging the air return bulkhead with the mounting brackets and adjusting the straps, said step of reinstalling being accomplished without actuation of a fastening device extending through the flange portion.

17. The method of claim 10, wherein each of the mounting brackets includes a generally flat upwardly inclined surface to engage a corresponding slot.

18. The method of claim 1, wherein each of the offset portions of the bulkhead are positioned in the internal portion of the face panel of the bulkhead.

19. The method of claim 18, wherein the peripheral flange portion of the bulkhead forms a seal with the trailer wall.

20. The method of claim 18, wherein each of the offset portions of the bulkhead extend from the face panel towards the trailer wall.

21. The method of claim 18, wherein each of the offset portions of the bulkhead do not contact the trailer wall.

22. The method of claim 1, wherein each of the mounting brackets comprise an angled portion that extends from the trailer wall at an upward angle such that at least a portion of the bulkhead is maintained between the angled portion and the trailer wall.

* * * * *